(12) United States Patent
Rose

(10) Patent No.: US 7,296,407 B2
(45) Date of Patent: Nov. 20, 2007

(54) HYDRAULIC SERVICE MODULE

(75) Inventor: Kenric B. Rose, Howell, MI (US)

(73) Assignee: Bosch Rexroth Corporation, Hoffman Estates, IL (US)

( * ) Notice: Subject to any disclaimer, the term of this patent is extended or adjusted under 35 U.S.C. 154(b) by 358 days.

(21) Appl. No.: 11/073,995

(22) Filed: Mar. 8, 2005

(65) Prior Publication Data

US 2005/0193730 A1    Sep. 8, 2005

Related U.S. Application Data

(60) Provisional application No. 60/550,315, filed on Mar. 8, 2004.

(51) Int. Cl.
*F16D 31/02* (2006.01)
(52) U.S. Cl. .............. 60/414; 60/418; 60/456
(58) Field of Classification Search .......... 60/413, 60/414, 416, 418, 456
See application file for complete search history.

(56) References Cited

U.S. PATENT DOCUMENTS

| | | | |
|---|---|---|---|
| 2,938,347 A | 5/1960 | Sturgis | |
| 4,211,080 A | 7/1980 | White | |
| 4,218,886 A | 8/1980 | White | |
| 4,941,437 A * | 7/1990 | Suzuki et al. | ........ 60/456 |
| 5,104,294 A | 4/1992 | Banba | |
| 5,678,982 A | 10/1997 | Schwaiger | |
| 6,805,984 B2 * | 10/2004 | Harth | ........ 429/13 |

FOREIGN PATENT DOCUMENTS

| | | |
|---|---|---|
| DE | 4219462 A1 | 12/1993 |
| EP | 0 244 549 | 11/1987 |
| JP | 49089074 | 8/1974 |
| JP | 09249042 | 9/1997 |
| WO | WO 98/42986 | 10/1998 |
| WO | WO 98/56630 | 12/1998 |
| WO | WO 00/05114 | 2/2000 |
| WO | WO 00/27662 | 5/2000 |

* cited by examiner

*Primary Examiner*—Michael Leslie
(74) *Attorney, Agent, or Firm*—Berenato, White & Stavish

(57) ABSTRACT

A hydraulic service module is provided for a hydraulic fluid system, which includes a fluid reservoir for storing an appropriate amount of a hydraulic fluid. The hydraulic service module comprises an outer casing defining an enclosure therewithin including an air chamber in fluid communication with an ambient air. The hydraulic service module houses one or more fluid pressure accumulators mounted within the enclosure and a heat exchanger provided for cooling the hydraulic fluid.

28 Claims, 12 Drawing Sheets

HYDRAULIC SERVICE MODULE

CROSS-REFERENCE TO RELATED APPLICATION

This Application claims the benefit under 35 U.S.C. 119(e) of U.S. Provisional Application No. 60/550,315 filed on Mar. 8, 2004 by Kenric Rose.

BACKGROUND OF THE INVENTION

1. Field of the Invention

The present invention relates to hydraulic fluid systems in general, such as hydraulic regenerative drive systems, and, more particularly, to a service module for a hydraulic fluid system including a hydraulic service module containing at least one hydraulic fluid accumulator.

2. Description of the Prior Art

In conventional integrated pressurized fluid systems the recovered energy is normally accumulated in flywheel accumulators, in electrochemical batteries or in hydraulic fluid accumulators. The latter are of known technology and, in comparison with the other recovery and accumulation arrangements, they are more flexible in use, notably in connection with a vehicular transmission to which they are connected. On the other hand they remain less efficient in terms of mass and volume and consequently raise serious problems for fitting onto motor vehicles. In addition to penalizing the energy savings obtained, these problems of dead weight and bulk lead to high costs linked either with the hydraulic fluid accumulator itself or, mainly, with the modifications that have to be made to the vehicle to fit the accumulator. The result is that the motor vehicles equipped with the hydraulic fluid accumulator are no longer standard in any way and are therefore much more expensive to produce and maintain and that, furthermore, the equipment used for this installation cannot be transposed to another vehicle or modulated in size, which increases the overall cost of such an installation.

Furthermore, as parts of a hydraulic regenerative drive system being incorporated into a motor vehicle, such as a cargo box trucks, it is necessary to package various system components onto the vehicle. In the existing vehicles equipped with the hydraulic regenerative drive system, the necessary system components are distributed around the vehicle in a fashion that would be unacceptable in a production system. In particular, the existing vehicles have components mounted in the cargo area and in other areas which required that the existing components be relocated. Moreover, the primary design challenge lies in the fact that some motor vehicles have several variants. It is required to design a system packaging configuration which would be common to all variants, would not violate the existing vehicle envelope, and would not intrude upon the cargo area of the motor vehicle.

Accordingly, it is the intent of this invention to overcome these shortcomings of the prior art by providing a compact service module including a pressure vessel assembly combining all the accumulation functions and capable of being fitted without any substantial modification to various types of pressurized fluid systems, including standard motor vehicles equipped with hydraulic regenerative drive system intended for charging and discharging the hydraulic fluid accumulators.

SUMMARY OF THE INVENTION

The present invention provides a hydraulic service module for use in a hydraulic fluid system having a fluid reservoir for storing an appropriate amount of a hydraulic fluid. The hydraulic service module of the present invention is especially suitable for a hydraulic regenerative drive system of a motor vehicle.

The hydraulic service module of the present invention comprises an outer casing defining an enclosure therewithin. The enclosure includes an air chamber in fluid communication with an ambient air. The hydraulic service module houses one or more fluid pressure accumulators disposed in the enclosure and a heat exchanger provided for cooling the hydraulic fluid.

Preferably, the hydraulic service module of the present invention further includes a cooling fan allowing forced airflow through the heat exchanger for forced cooling of the hydraulic fluid.

Moreover, according to the preferred embodiment of the present invention, the hydraulic service module includes a valve manifold for selectively fluidly interconnecting the hydraulic accumulators and the fluid reservoir.

Furthermore according to the preferred embodiment of the present invention, the hydraulic service module includes an air inlet port providing access for air entering the air chamber, and an air filter mounted adjacent to the inlet port for removing airborne contaminants from air entering the air chamber.

Therefore, as part of the mobile hydraulic regenerative drive system, the hydraulic service module in accordance with the present invention integrates and modularizes the bulk of the essential components of the hydraulic regenerative drive system, other than those that convert mechanical energy to and from hydraulic energy and those that connect to a driveline of the motor vehicle, such as a hydraulic regenerative drive unit.

BRIEF DESCRIPTION OF THE DRAWINGS

Objects and advantages of the invention will become apparent from a study of the following specification when viewed in light of the accompanying drawings, wherein.

DESCRIPTION OF PREFERRED EMBODIMENT

The preferred embodiment of the present invention will now be described with the reference to accompanying drawings.

Figure 1:
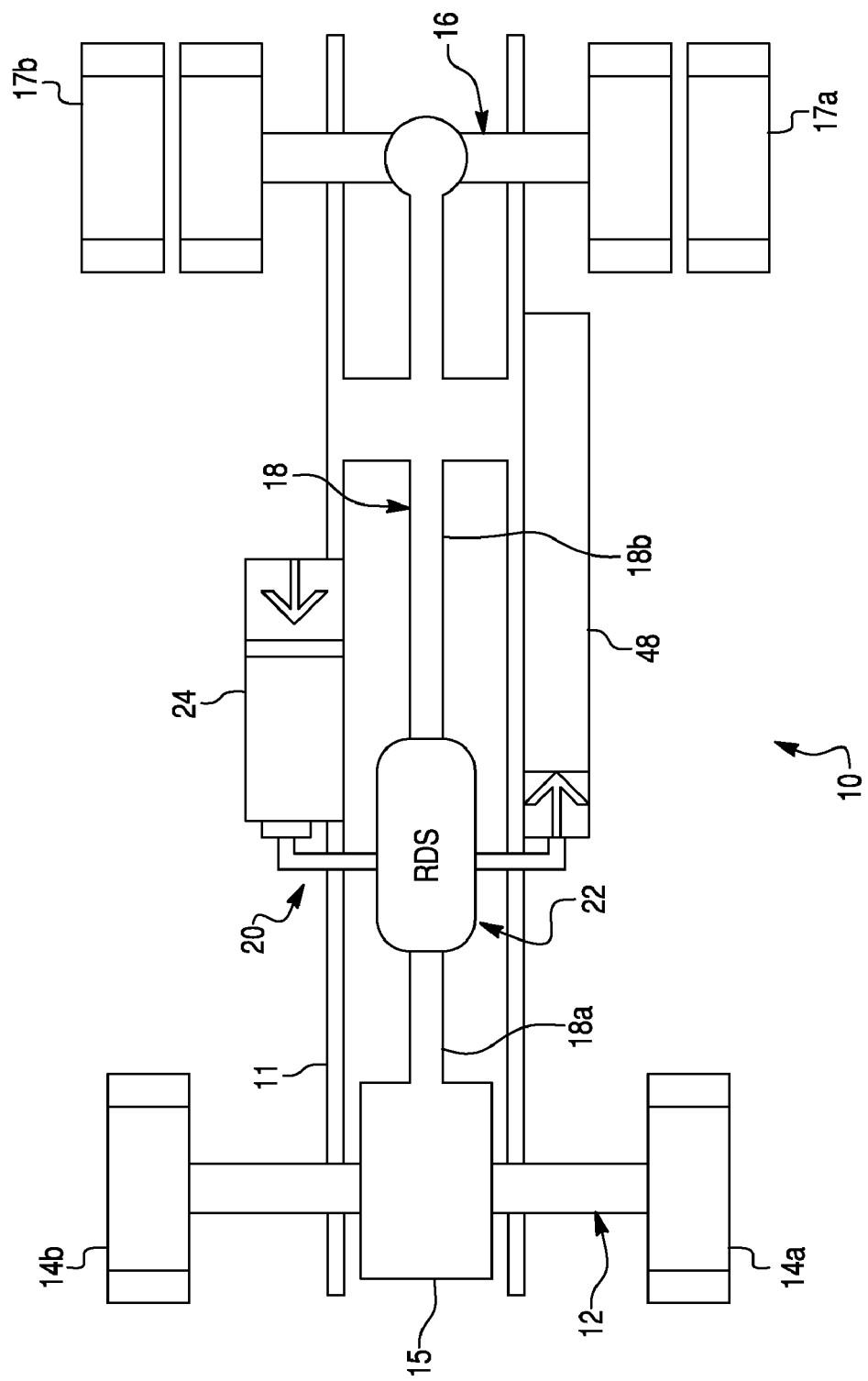
FIG. 1 is a schematic view of a motor vehicle equipped with a hydraulic regenerative drive system in accordance with the present invention.

FIG. 1 depict a motor vehicle 10 equipped with a hydraulic fluid system in the form of a hydraulic regenerative drive system 20 in accordance with the preferred embodiment of the present invention. As illustrated, the motor vehicle 10 comprises a front axle 12 having wheels 14*a* and 14*b*, a rear drive axle 16 having wheels 17*a* and 17*b* driven by a prime mover 15, such as an internal combustion engine, through a driveline 18.

Figure 2:
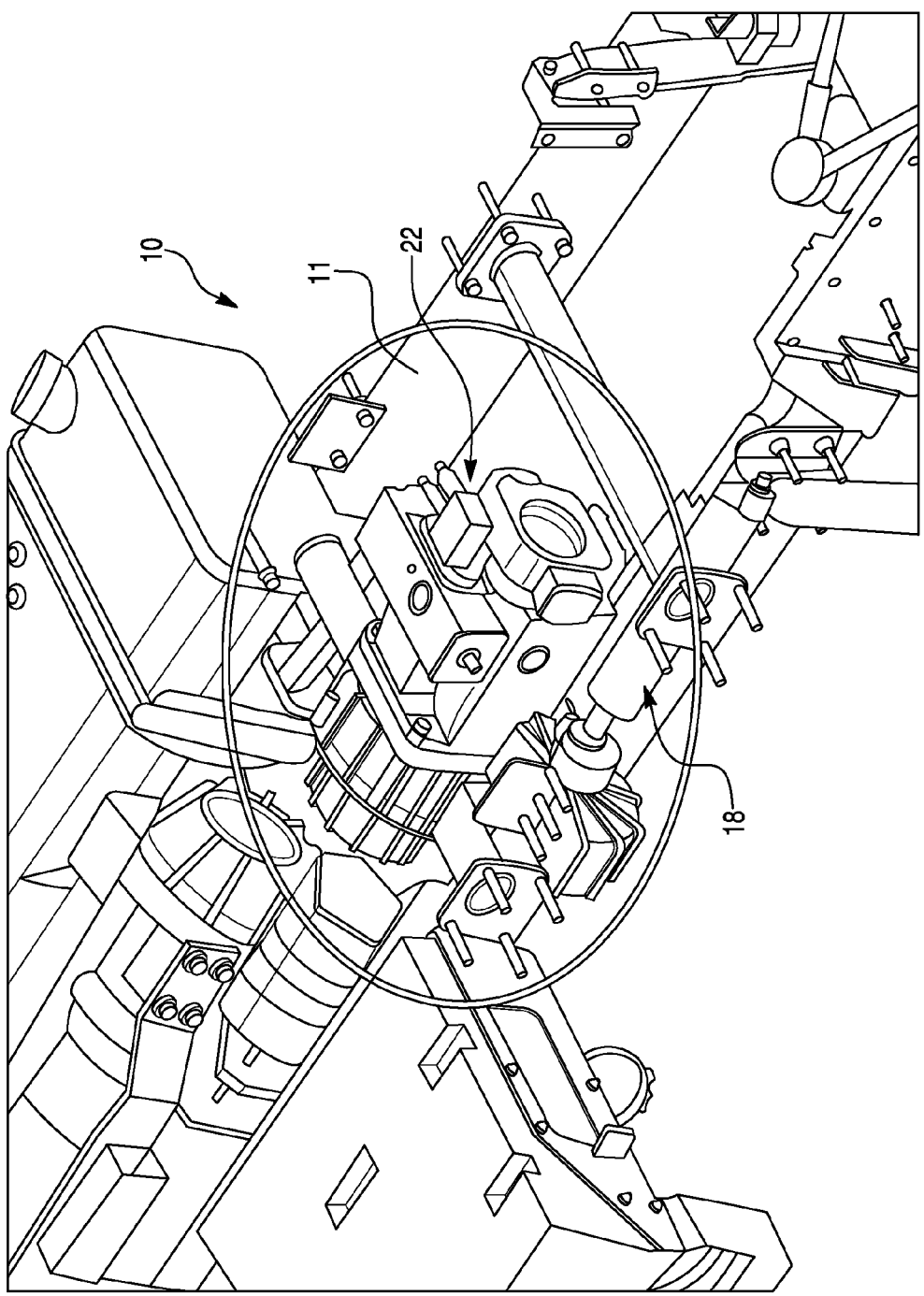
FIG. 2 is a partial perspective view of a hydraulic regenerative drive unit mounted to the motor vehicle parallel to a vehicular driveline.

The hydraulic regenerative drive system 20 includes a low-pressure fluid reservoir 24, a high-pressure hydraulic accumulator 26 and a hydraulic regenerative drive unit 22 in fluid communication with both the low-pressure fluid reservoir 24 and the high-pressure accumulator 26. The fluid reservoir 24 of the hydraulic regenerative drive system 20, shown in FIG. 1, and contains an appropriate amount of a hydraulic working fluid, such as oil, at either atmospheric or low above-atmospheric pressure. In other words, the fluid reservoir 24 is at least partially filled with the working hydraulic fluid:

As further illustrated in FIGS. 1 and 2, the hydraulic regenerative drive unit 22 is mounted to a frame member 11 of the motor vehicle 10 between a main shaft 18*a* and a rear shaft 18*b* of the driveline 18.

Figure 3:
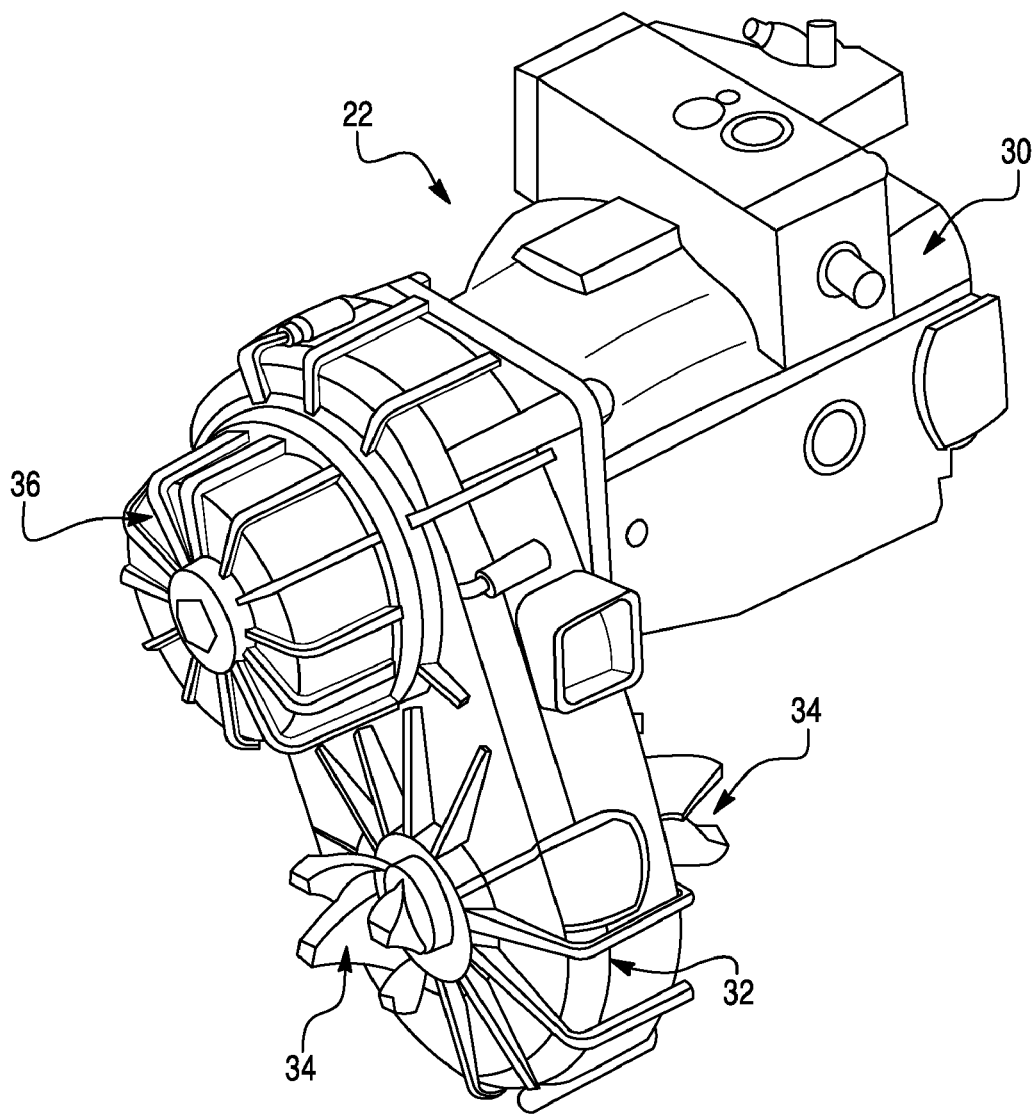
FIG. 3 is a perspective view of the hydraulic regenerative drive unit with an interface gearbox provided to couple the regenerative drive unit to the vehicular driveline in accordance with the present invention.
Figure 4:
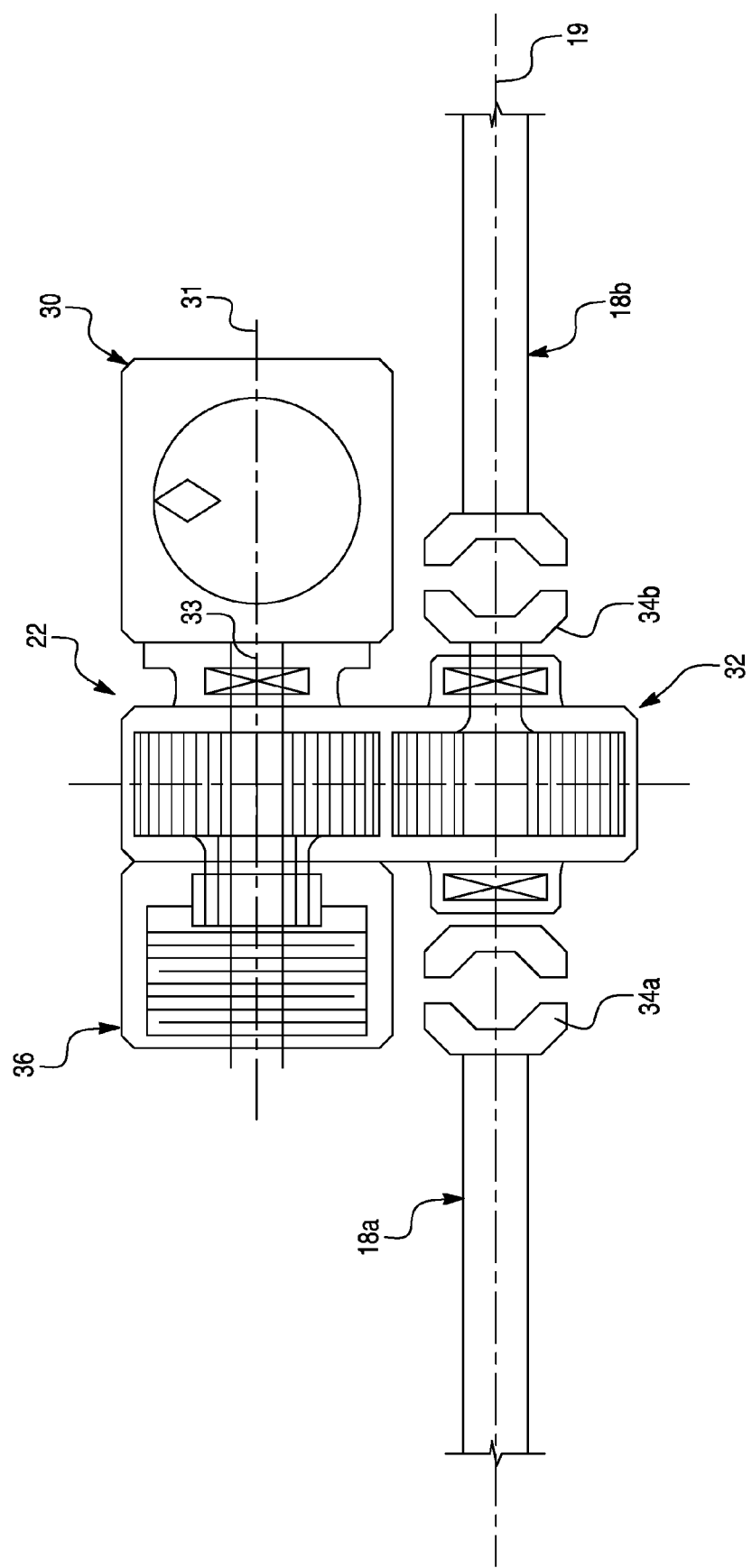
FIG. 4 is a sectional view of the interface gearbox with a clutch assembly in accordance with the present invention coupling the regenerative drive unit to the vehicular driveline.

The hydraulic regenerative drive unit 22, illustrated in detail in FIGS. 3 and 4, comprises a hydraulic pump/motor 30 having an axis of rotation 31, a transfer gearbox 32 and a clutch assembly 36 provided for selectively coupling/decoupling the pump/motor 30 to/from the transfer gearbox 32. The transfer gearbox 32 is provided for a speed multiplication or reduction ratio between the pump/motor 30 and the driveline 18. Preferably, the interface gearbox 34 includes a set of gears providing any desirable gear ration between the pump/motor 30 and the driveline 18. Alternatively, the transfer gearbox 34 includes a chain or belt member to physically connect the main shaft 18*a* of the driveline 18 to a main shaft 33 of the pump/motor 30. Optionally, the transfer gearbox 32 may be in the form of a multiple speed ratio gearbox.

Figure 5:
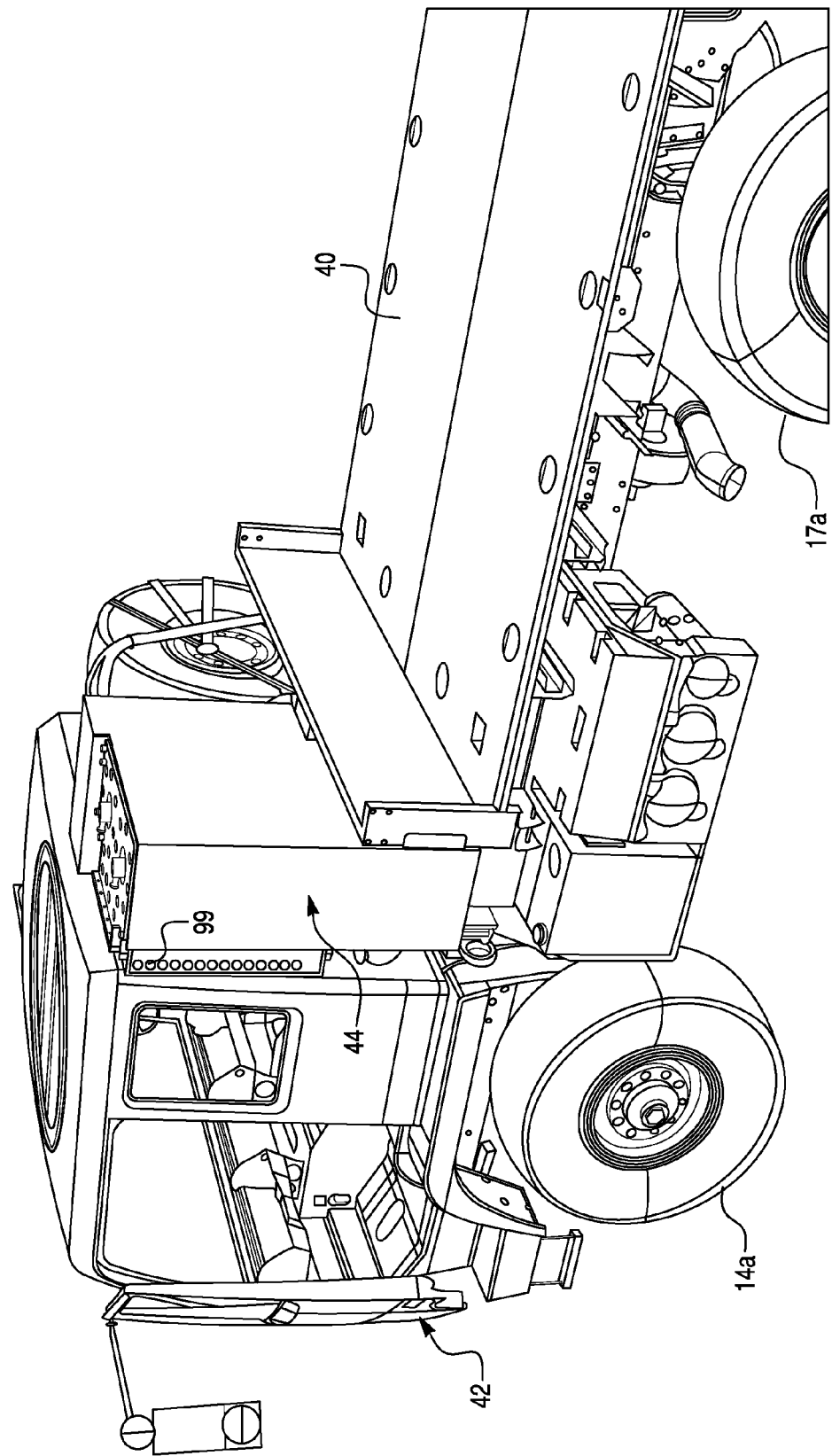
FIG. 5 is a perspective view of a motor vehicle equipped with a hydraulic service module in accordance with the present invention.

As further illustrated in FIG. 5, the motor vehicle 10 includes a cabin 42, a cargo box 40 mounted to a frame member 11 behind the cabin 42, and a hydraulic service module 44 disposed in a space defined between the cargo box 40 and the cabin 42.

The hydraulic service module 44 is designed to integrate and modularize the bulk of the essential system components, other than those that convert mechanical energy to and from hydraulic energy and those that connect to the driveline 18 of the vehicle, such as the hydraulic regenerative drive unit 22. The hydraulic service module 44 is provided to package as many system components as possible into a single enclosed, modular package.

Figure 11:
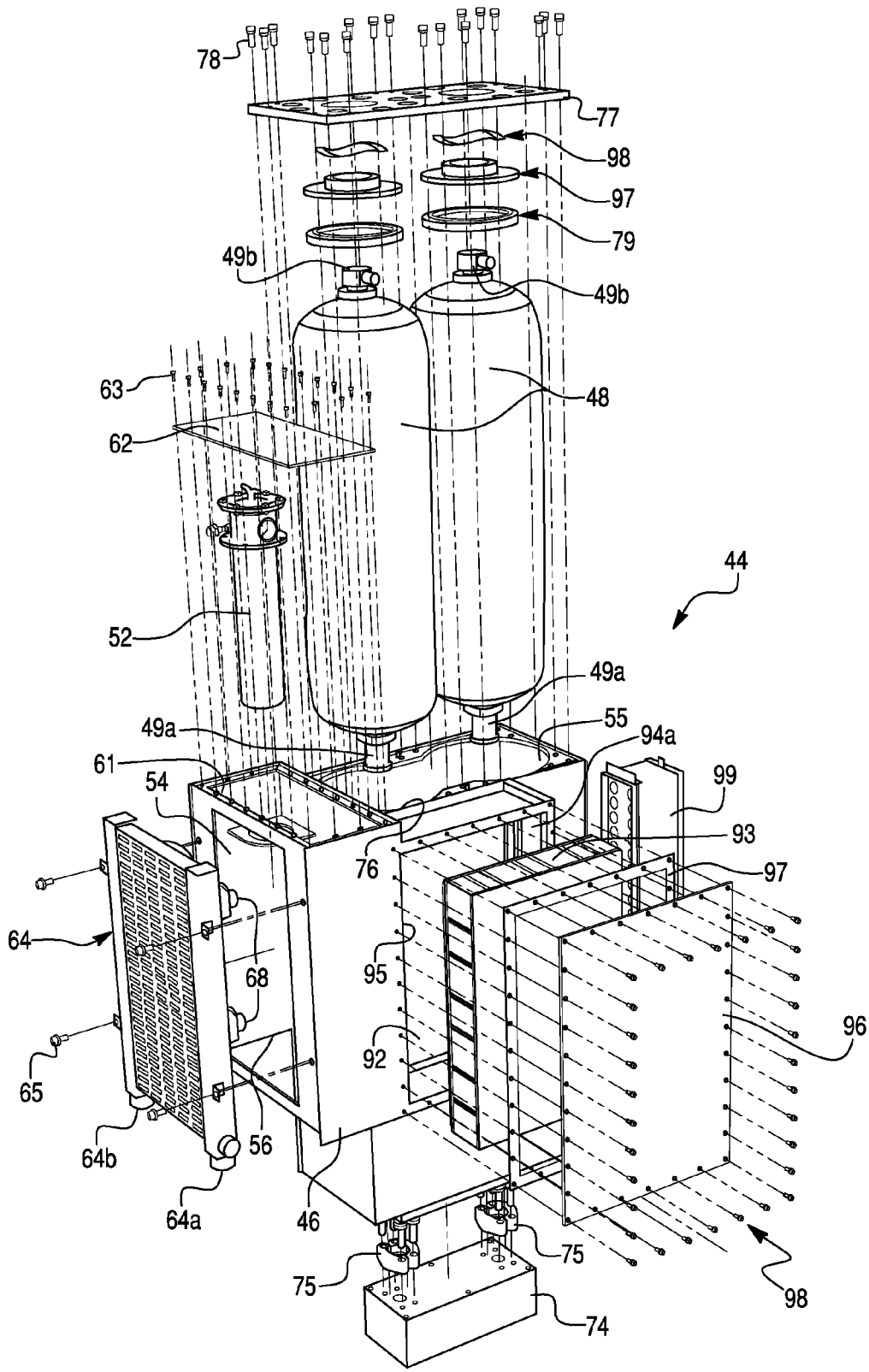
FIG. 11 is an exploded view of the hydraulic service module in accordance with the first exemplary embodiment of the present invention.
Figure 12:
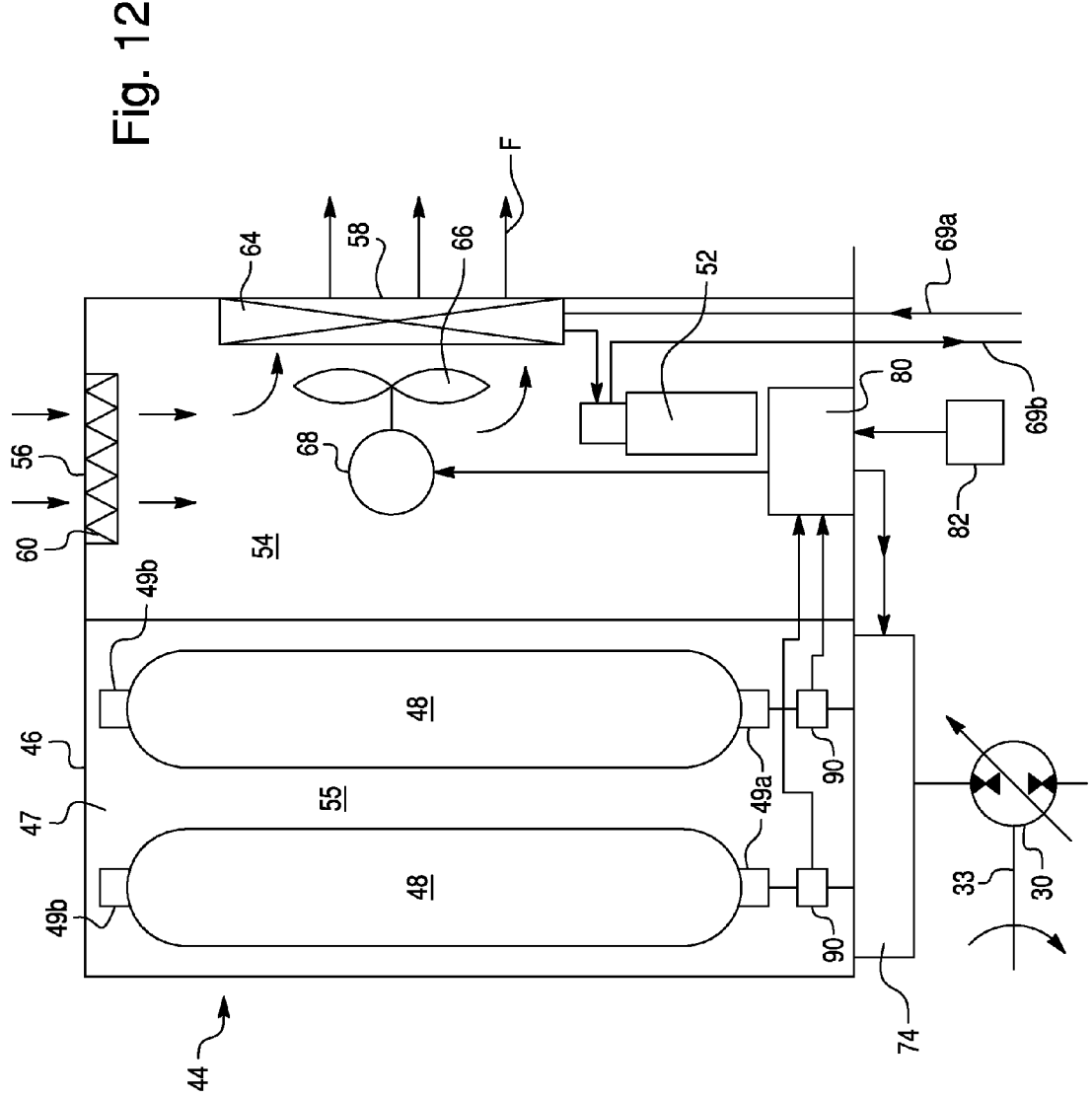
FIG. 12 is schematic view of the hydraulic service module in accordance with the first exemplary embodiment of the present invention.

The hydraulic services module 44 according to a first exemplary embodiment of the present invention and illustrated in detail in FIGS. 6-12, comprises an enclosed outer casing 46 defining a whether-tight enclosure 47. The enclosure 47 includes an air chamber 54. The air chamber 54 is provided with an access opening 61 covered with an air chamber cover 62 secured to the casing 46 by a plurality of fasteners 63. The air chamber 54 is in fluid communication with an ambient air outside the hydraulic services module 44 through an intake port 56 providing access for the air entering the air chamber 54, and an exhaust port 58 providing access for air exiting the air chamber 54. Preferably, the casing 46 is provided with an air filter element 60 for removing airborne contaminants from the air entering the air chamber 54, as shown in FIG. 12, adjacent to the inlet port 56.

Moreover, the casing 46 of the hydraulic services module 44 according to the first exemplary embodiment of the present invention, defines an air cleaner housing 92 receiving an engine air cleaner element 93 that prevents air-born particle in the air from entering a combustion chamber of the internal combustion engine 15. In other words, the air cleaner element 93 mounted within the hydraulic services module 44 is part of an air induction system of the engine 15. Preferably, the air cleaner element 93 is mounted in the air cleaner housing 92 in the casing 46 adjacent to an air cleaner inlet port 94*a*. The air filtered by the air cleaner element 93 exits the air cleaner housing 92 through an air cleaner outlet port 94*b*. An engine induction air filtration flow path is depicted by the reference K in FIG. 7. The air cleaner outlet port 94*b* is fluidly connected to the combustion chamber of the internal combustion engine 15. The air cleaner element 93 is inserted into the cleaner housing 92 through an access opening 95 therein. The access opening 95 in the air cleaner housing 92 is covered with an air cleaner housing cover 96 secured to the casing 46 through a gasket 97 by a plurality of fasteners 98. Preferably, the hydraulic service module 44 is also provided with an air pre-cleaner 99 adjacent to the cleaner inlet port 94 outside the casing 46.

Figure 6:
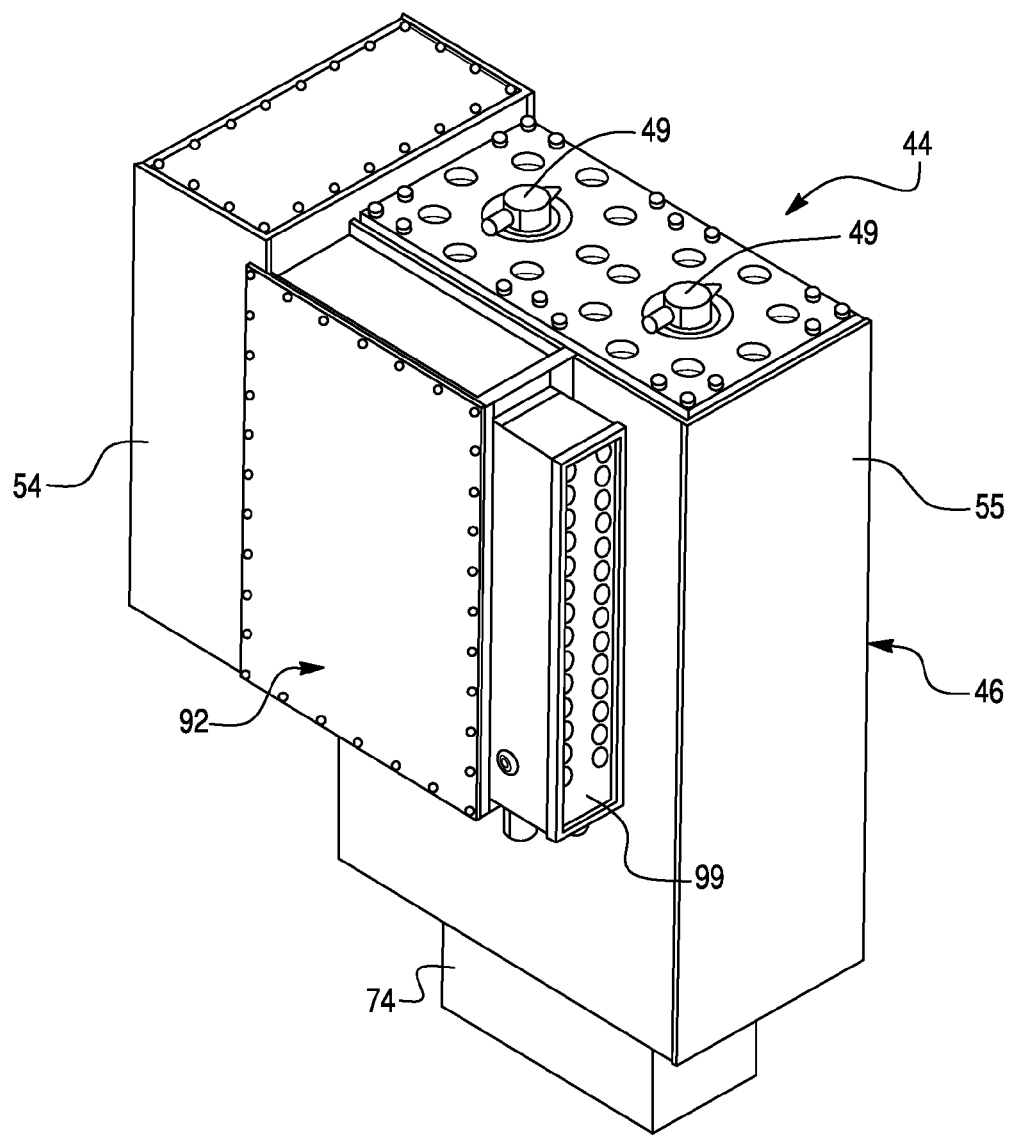
FIG. 6 is a perspective view of the hydraulic service module in accordance with a first exemplary embodiment of the present invention.
Figure 7:
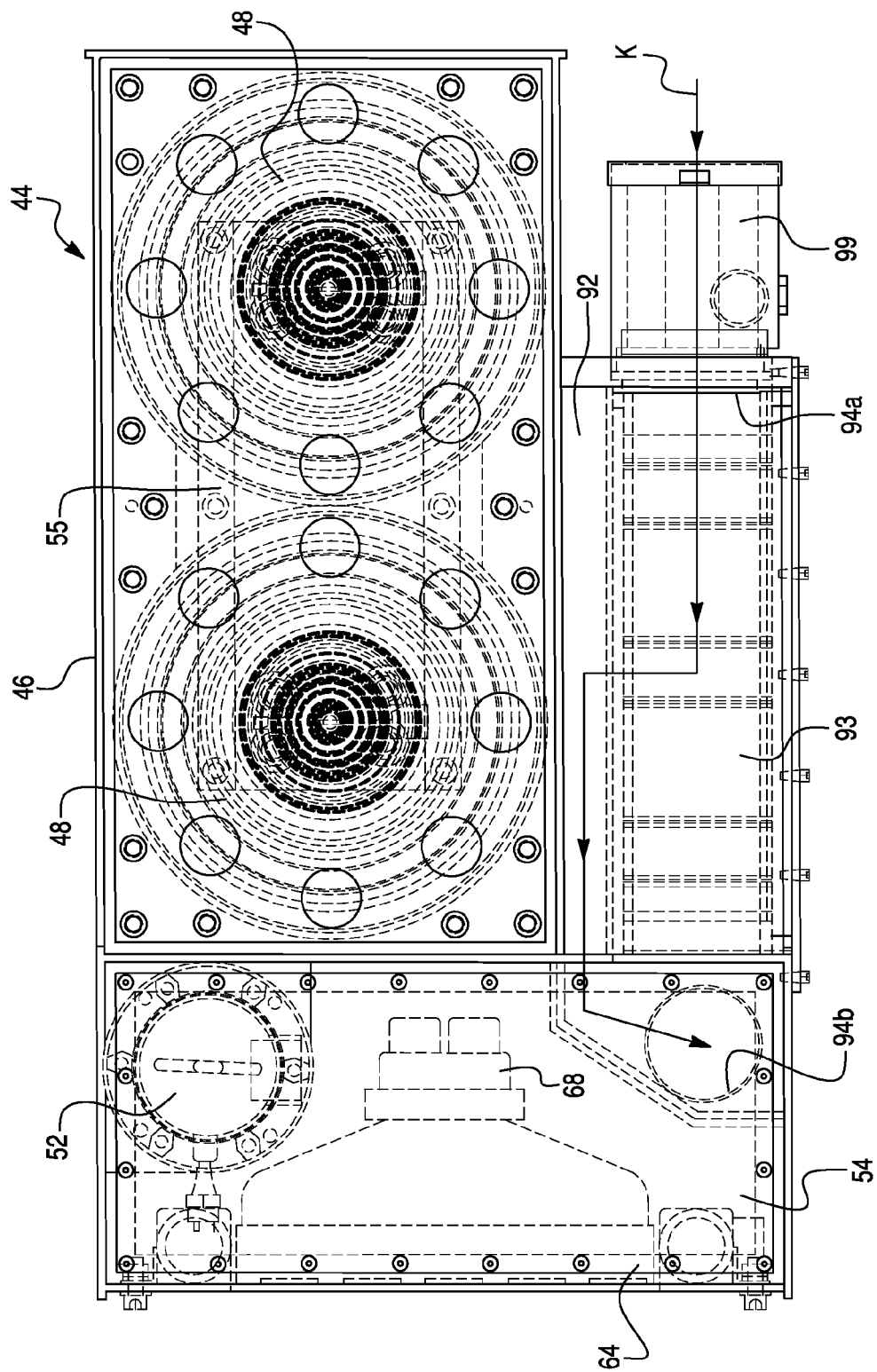
FIG. 7 is a top view of the hydraulic service module in accordance with the first exemplary embodiment of the present invention.
Figure 8:
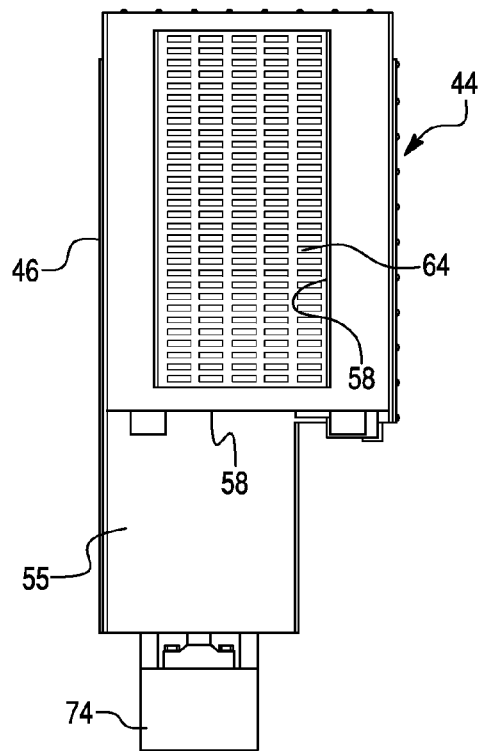
FIG. 8 is a right side view of the hydraulic service module in accordance with the first exemplary embodiment of the present invention.
Figure 9:
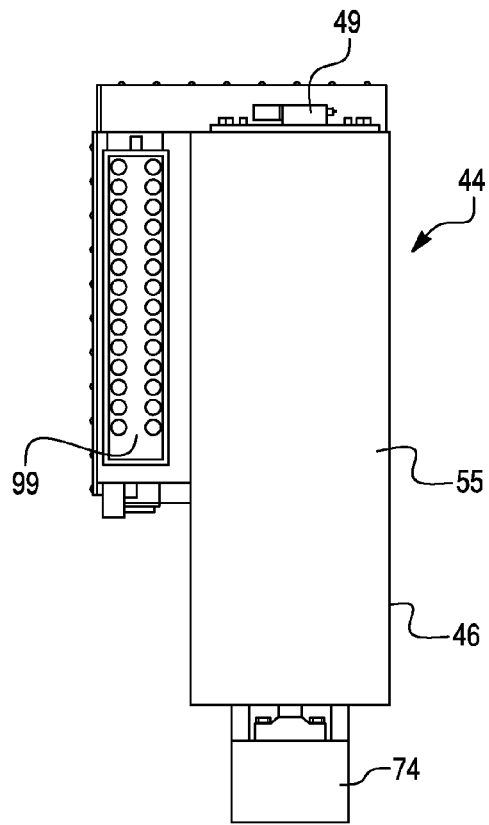
FIG. 9 is a left side view of the hydraulic service module in accordance with the first exemplary embodiment of the present invention.
Figure 10:
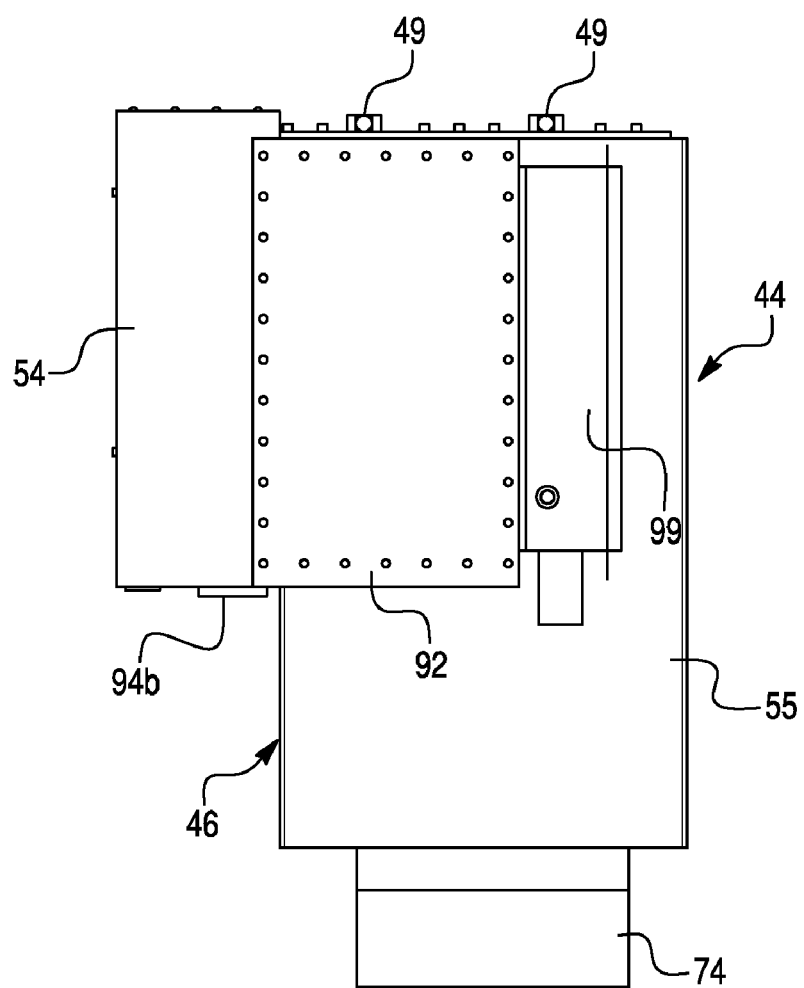
FIG. 10 is a front view of the hydraulic service module in accordance with the first exemplary embodiment of the present invention.

Furthermore, the enclosure 47 within the casing 46 houses one or more high-pressure hydraulic accumulators 48. Preferably, as illustrated in FIGS. 6 and 7, the hydraulic services module 44 includes two high-pressure hydraulic accumulators 48. It will be appreciated that any appropriate type of the high-pressure hydraulic accumulators 48 may be employed. Preferably, the hydraulic accumulators 48 are hydro-pneumatic accumulators known in the art. Each of the hydro-pneumatic accumulators 48 has a communication port 49*a* connected to the regenerative drive unit 22, and a gas charging port 49*b*.

Preferably, the outer casing 46 of the hydraulic services module 44 further includes an enclosed accumulator storage compartment 55 within the enclosure 47 housing the high-pressure hydraulic accumulators 48. The hydraulic accumulators 48 are secured within the accumulator chamber 55 by any appropriate means. The hydraulic accumulators 48 are inserted into the accumulator chamber 55 through an access opening 76 therein. The access opening 76 in the accumulator chamber 55 is covered with an accumulator chamber cover 77 secured to the casing 46 by a plurality of fasteners 78. Preferably, each of the hydraulic accumulators 48 is mounted to the accumulator chamber cover 77 through an elastomeric isolator ring 79, an isolator ring support 97 and an isolator ring support spring 98.

The hydraulic accumulators 48 are fluidly connected to the hydraulic pump/motor 30 and the low-pressure fluid reservoir 24. During the operation of the hydraulic regenerative drive system 20, the hydraulic fluid within the system heats up. In order to dissipate heat energy of the hydraulic fluid, the hydraulic service module 44 further comprises a heat exchanger 64 having an inlet port 64a and an outlet port 64b. Preferably, the heat exchanger 64 is an air/fluid heat exchanger disposed in the air chamber 54. More preferably, the heat exchanger 64 is secured to the casing 46 adjacent to the exhaust port 58 by a plurality of fasteners 65. In order to produce a cooling airflow F through the heat exchanger 64, at least one cooling fan 66 associated with the heat exchanger 64 is provided for forced cooling of the hydraulic fluid flowing through the heat exchanger 64. The cooling fan 66 is selectively driven by a drive motor 68. Preferably, the drive motor 68 is an electric motor. However, any other type of the drive motor, such as hydraulic motor, will be within the scope of the present invention. The heat exchanger 64 is fluidly connected to the fluid reservoir 24 via hydraulic lines 69a associated with the inlet port 64a of the heat exchanger 64 and 69b associated with the outlet port 64b thereof. The hydraulic fluid flowing through the heat exchanger 64 passes through a particulate fluid filter 52 for removing contaminants from the hydraulic fluid 51. As illustrated in FIG. 12, the particulate fluid filter 52 communicates with the outlet port 64b of the heat exchanger 64. Preferably, the particulate fluid filter 52 is disposed within the air chamber 54. Further preferably, the hydraulic service module 44 has two cooling fans 66 each driven by the associated electric motor 68.

Furthermore, the hydraulic service module 44 includes a valve manifold 74 provided to control the hydraulic regenerative drive system 20. The valve manifold 74 one or more hydraulic control valves selectively operated by electromagnetic solenoids. Preferably, as illustrated in FIGS. 6 and 7, the valve manifold 74 is mounted to a bottom surface of the casing 46 of the hydraulic service module 44. As further illustrated in FIG. 12, the valve manifold 74 selectively fluidly connects the high-pressure hydraulic accumulators 48 to the hydraulic pump/motor 30, and through the hydraulic pump/motor 30 to the fluid reservoir 24. Preferably, the valve manifold 74 is connected to the communication port 49a of the hydraulic accumulator 48 through an accumulator-to-manifold clamp ring assembly 75, as shown in FIG. 11.

As further illustrated in FIG. 12, the first exemplary embodiment of the hydraulic service module 44 also includes an electronic control unit (ECU) 80 that selectively controls the fan motor 68 and the valve manifold 74. The above control is carried out by judging vehicle running conditions according to at least one vehicle operating parameter, and at least one operating parameter of the hydraulic regenerative drive system 20. The at least one vehicle parameter includes but is not limited to a vehicle acceleration and a vehicle brake pedal application inputted into the ECU 80 from one or more vehicle operating parameter sensors generally depicted by the reference numeral 82. The at least one operating parameter of the hydraulic regenerative drive system 20 includes but is not limited to a fluid level and a fluid temperature in the fluid reservoir 24, and a hydraulic pressure within accumulators 48 monitored by a reservoir fluid level sensor (not shown), a reservoir fluid temperature sensor (not shown) and an accumulator pressure sensors 90, respectively. Preferably, the ECU 80 is cooled by the airflow passing through the air chamber 54.

More specifically, the ECU 80 controls the electric motor 68 driving the cooling fan 66 based on inputs from the reservoir fluid level sensor and the reservoir fluid temperature sensor. In operation, when the temperature of the cooling fluid in the fluid reservoir 24 reaches a predetermined value, the ECU 80 turns the motor 68 on. Subsequently, the rotation of the cooling fan 66 driven by the motor 68 creates the airflow F through the heat exchanger 64 so that the ambient air enters the air chamber 54 through the intake port 56, passes through the air pre-cleaner 96 and the air filter element 60 to removing airborne contaminants, then flows through the heat exchanger 64 to remove heat from the hydraulic fluid, and exits the casing 46 through the exhaust port 58.

Furthermore, the ECU 80 controls the valve manifold 74, thus the hydraulic pump/motor 30 of the hydraulic regenerative drive unit 22, on inputs from one or more of the vehicle operating parameter sensors 82 and the accumulator pressure sensors 90.

Figure 13:
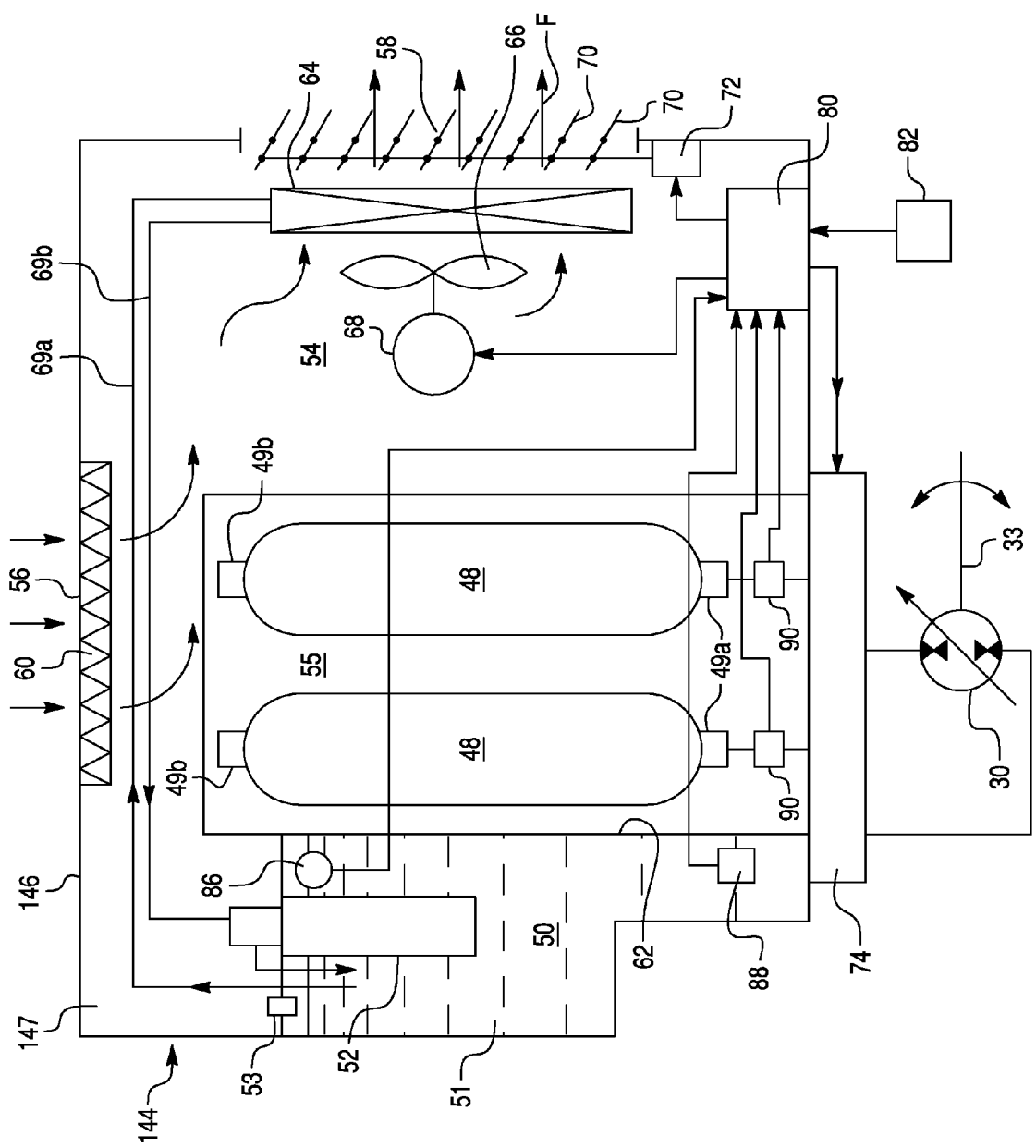
FIG. 13 is schematic view of the hydraulic service module in accordance with the second embodiment of the present invention.

FIG. 13 of the drawings schematically illustrates a second exemplary embodiment of a hydraulic services module, depicted with the reference numeral 144. Components, which are unchanged from, or function in the same way as in the first exemplary embodiment depicted in FIGS. 1-12 are labeled with the same reference characters. The hydraulic services module 144 of FIG. 13 substantially corresponds to the hydraulic services module 44 of FIGS. 6-12, and only the portions, which differ, will therefore be explained in detail below, sometimes without describing detail since similarities between the corresponding parts in the two embodiments will be readily perceived by the reader.

More specifically, the hydraulic services module 144 according to the second exemplary embodiment of the present invention comprises an enclosed outer casing 146 defining a whether-tight enclosure 147. The enclosure 147 is divided into an enclosed fluid reservoir 50 and an air chamber 54. The fluid reservoir 50 represents the low-pressure reservoir 24 of the hydraulic regenerative drive system 20, shown in FIG. 1, and contains an appropriate amount of a hydraulic working fluid 51, such as oil, at either atmospheric or low above-atmospheric pressure. In other words, the fluid reservoir 50 is at least partially filled with the working hydraulic fluid 51. Moreover, the fluid reservoir 50 is provided with an air-breather device 53.

The heat exchanger 64 is fluidly connected to the fluid reservoir 50 via hydraulic lines 69a and 69b. The hydraulic fluid 51 flowing through the heat exchanger 64 passes through a particulate fluid filter 52 for removing contaminants from the hydraulic fluid 51. Preferably, the fluid filter 52 is disposed within the fluid reservoir 50.

Moreover, the casing 146 of the hydraulic services module 144 according to the second exemplary embodiment of the present invention has a plurality of selectively adjustable louvers 70 mounted adjacent to the air outlet port 58 thereof adapted to protect the heat exchanger 58. Preferably, the louvers 70 are driven by an actuator 72 for automatically adjusting angular position of the louvers 70.

More specifically, as illustrated in FIG. 13, the ECU 80 controls the electric motor 68 driving the cooling fan 66 based on inputs from a reservoir fluid level sensor 86 and a reservoir fluid temperature sensor 88 monitoring a fluid level and a fluid temperature in the fluid reservoir 50. In operation, when the temperature of the cooling fluid 51 in the fluid reservoir 50 reaches a predetermined value, the ECU 80 turns the motor 68 on. Subsequently, the rotation of the cooling fan 66 driven by the motor 68 creates the airflow F through the heat exchanger 64 so that the ambient air enters the air chamber 54 through the intake port 56, passes through the air filter 60 to removing airborne contaminants, then flows through the heat exchanger 64 to remove heat from the cooling fluid 51, and exits the casing 146 through the exhaust port 58. The airflow F exiting the casing 146 is further controlled by adjusting angular position of the louvers 70. The angular position of the louvers 70 is controlled by the louver actuator 72 operated by the ECU 80.

Therefore, as part of the mobile hydraulic regenerative drive system 20, the hydraulic service module in accordance with the present invention integrates and modularizes the bulk of the essential components of the hydraulic regenerative drive system 20, other than those that convert mechanical energy to and from hydraulic energy and those that connect to the driveline 18 of the motor vehicle 10, such as the hydraulic regenerative drive unit 22. The hydraulic service module is provided to package as many essential system components as possible into a single enclosed, modular unit that provides a number of advantages over a design in which the various components are not integrated in a single package, such as:

Allowance for pre-fabrication of the bulk of the system;
Ease of installation;
Better serviceability;
Greater protection of components as they are contained within a common enclosure;
Greater protection of component interconnects.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A hydraulic service module in a hydraulic regenerative drive system of a motor vehicle; said hydraulic regenerative drive system having a fluid reservoir for storing an appropriate amount of a hydraulic fluid, said hydraulic service module comprising:
    an outer casing defining an enclosure;
    an air chamber formed in said enclosure, said air chamber being in fluid communication with an ambient air;
    at least one fluid pressure accumulator disposed in said enclosure; and
    a heat exchanger provided for cooling said hydraulic fluid;
    said hydraulic service module being disposed in a space defined between a cargo box and a cabin of said motor vehicle.

2. The hydraulic service module as defined in claim 1, wherein said heat exchanger is disposed in said air chamber.

3. The hydraulic service module as defined in claim 2, wherein said casing has an air inlet port providing access for air entering said air chamber.

4. The hydraulic service module as defined in claim 3, further including an air filter element mounted adjacent to said inlet port for removing airborne contaminants from air entering said air chamber.

5. The hydraulic service module as defined in claim 3, wherein casing has an air exhaust port providing access for air exiting said air chamber.

6. The hydraulic service module as defined in claim 5, wherein said heat exchanger is mounted adjacent to said exhaust port.

7. The hydraulic service module as defined in claim 5, further including a plurality of selectively adjustable louvers mounted adjacent to said air exhaust port of said casing.

8. The hydraulic service module as defined in claim 7, further including a louver actuator for automatically adjusting angular position of said louvers.

9. The hydraulic service module as defined in claim 8, further including at least one sensor monitoring at least one operating parameter of the hydraulic regenerative drive system and an electronic control unit provided for selectively controlling said louver actuator based on a signal from said at least one sensor.

10. The hydraulic service module as defined in claim 1, further including a particulate fluid filter disposed in said air chamber for filtering said hydraulic fluid.

11. The hydraulic service module as defined in claim 1, further including at least one cooling fan providing a forced air flow through said heat exchanger.

12. The hydraulic service module as defined in claim 11, wherein said at least one cooling fan is selectively driven by an associated electric motor.

13. The hydraulic service module as defined in claim 12, further including at least one sensor monitoring at least one operating parameter of the hydraulic regenerative drive system and an electronic control unit provided for selectively controlling said electric motor based on a signal from said at least one sensor.

14. The hydraulic service module as defined in claim 13, wherein said at least one sensor is a reservoir fluid temperature sensor monitoring a hydraulic fluid temperature within said fluid reservoir.

15. The hydraulic service module as defined in claim 13, wherein said at least one sensor is a reservoir fluid level sensor monitoring a hydraulic fluid level within said fluid reservoir.

16. The hydraulic service module as defined in claim 1, wherein said enclosure is divided into said fluid reservoir and said air chamber both formed in said enclosure.

17. The hydraulic service module as defined in claim 16, further including a particulate fluid filter disposed in said fluid reservoir for filtering said hydraulic fluid.

18. The hydraulic service module as defined in claim 1, wherein said at least one fluid pressure accumulator is mounted in an enclosed accumulator storage compartment formed in said enclosure.

19. The hydraulic service module as defined in claim 1, further including a valve manifold for operatively fluidly interconnecting said at least one hydraulic accumulator and said fluid reservoir.

20. The hydraulic service module as defined in claim 19, wherein said valve manifold includes at least one hydraulic control valve selectively operated by an electromagnetic solenoid.

21. The hydraulic service module as defined in claim 20, further including at least one accumulator pressure sensor monitoring a hydraulic fluid pressure in said at least one hydraulic fluid pressure accumulator and an electronic control unit provided for selectively controlling said electromagnetic solenoid of said at least one hydraulic control valve based on a signal from said at least one accumulator pressure sensor.

22. The hydraulic service module as defined in claim 19, wherein said valve manifold is mounted to said casing of said hydraulic service module.

23. The hydraulic service module as defined in claim 1, wherein said hydraulic service module is mounted to a frame member of said motor vehicle.

24. The hydraulic service module as defined in claim 1, further including an engine air cleaner element that prevents air-born particle in the air from entering a combustion chamber of an internal combustion engine of said motor vehicle.

25. The hydraulic service module as defined in claim 24, wherein said air cleaner element is disposed in an air cleaner housing formed in said casing.

26. A hydraulic service module in a hydraulic fluid system having a fluid reservoir for storing an appropriate amount of a hydraulic fluid, said hydraulic service module comprising:
   an outer casing defining an enclosure;
   an air chamber formed in said enclosure, said air chamber being in fluid communication with an ambient air;
   at least one fluid pressure accumulator disposed in said enclosure; and
   a heat exchanger provided for cooling said hydraulic fluid;
   said at least one fluid pressure accumulator being mounted in an enclosed accumulator storage compartment formed in said enclosure.

27. A hydraulic service module in a hydraulic regenerative drive system of a motor vehicle; said hydraulic regenerative drive system having a fluid reservoir for storing an appropriate amount of a hydraulic fluid, said hydraulic service module comprising:
   an outer casing defining an enclosure;
   an air chamber formed in said enclosure, said air chamber being in fluid communication with an ambient air;
   at least one fluid pressure accumulator disposed in said enclosure;
   a heat exchanger provided for cooling said hydraulic fluid; and
   an engine air cleaner element that prevents air-born particle in the air from entering a combustion chamber of an internal combustion engine of said motor vehicle;
   said air cleaner element being disposed in an air cleaner housing formed in said casing.

28. A hydraulic service module in a hydraulic fluid system having a fluid reservoir for storing an appropriate amount of a hydraulic fluid, said hydraulic service module comprising:
   an outer casing defining an enclosure;
   an air chamber formed in said enclosure, said air chamber being in fluid communication with an ambient air;
   at least one fluid pressure accumulator disposed in said enclosure;
   a heat exchanger provided for cooling said hydraulic fluid;
   a valve manifold for operatively fluidly interconnecting said at least one hydraulic accumulator and said fluid reservoir, said valve manifold includes at least one hydraulic control valve selectively operated by an electromagnetic solenoid; and
   at least one accumulator pressure sensor monitoring a hydraulic fluid pressure in said at least one hydraulic fluid pressure accumulator and an electronic control unit provided for selectively controlling said electromagnetic solenoid of said at least one hydraulic control valve based on a signal from said at least one accumulator pressure sensor.

\* \* \* \* \*